Sept. 22, 1964 J. H. SWATS ETAL 3,149,500
CONTROL MECHANISM

Original Filed Oct. 21, 1957 8 Sheets-Sheet 1

INVENTORS
JOHN H. SWATS
SIDNEY E. HAGERTY
BY John A. Young
ATTORNEY

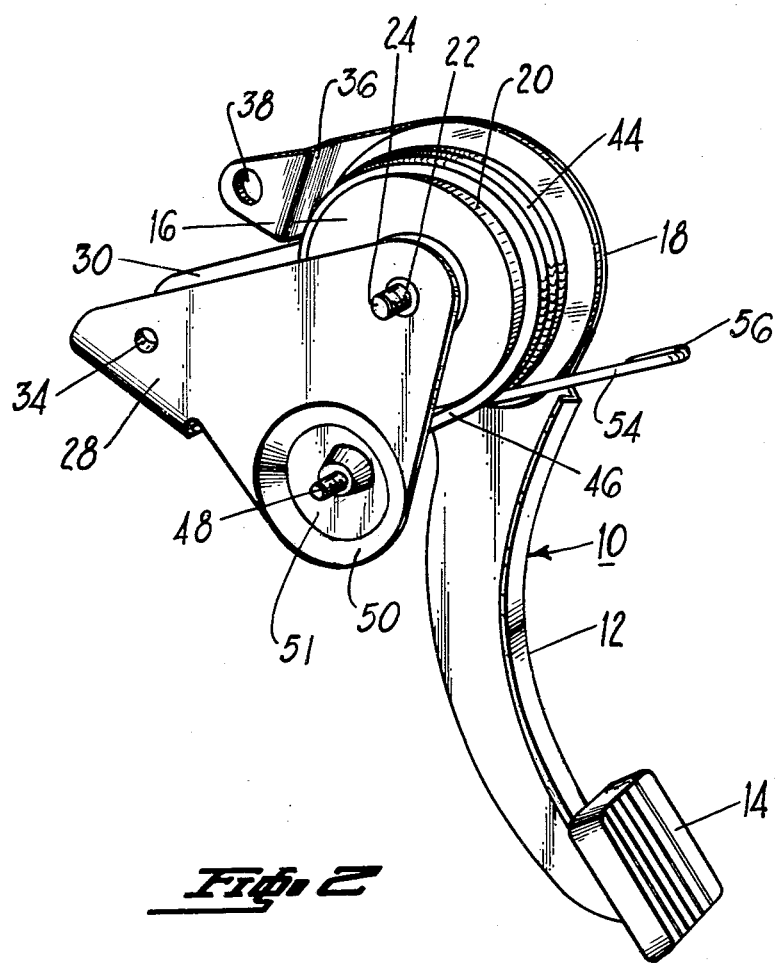

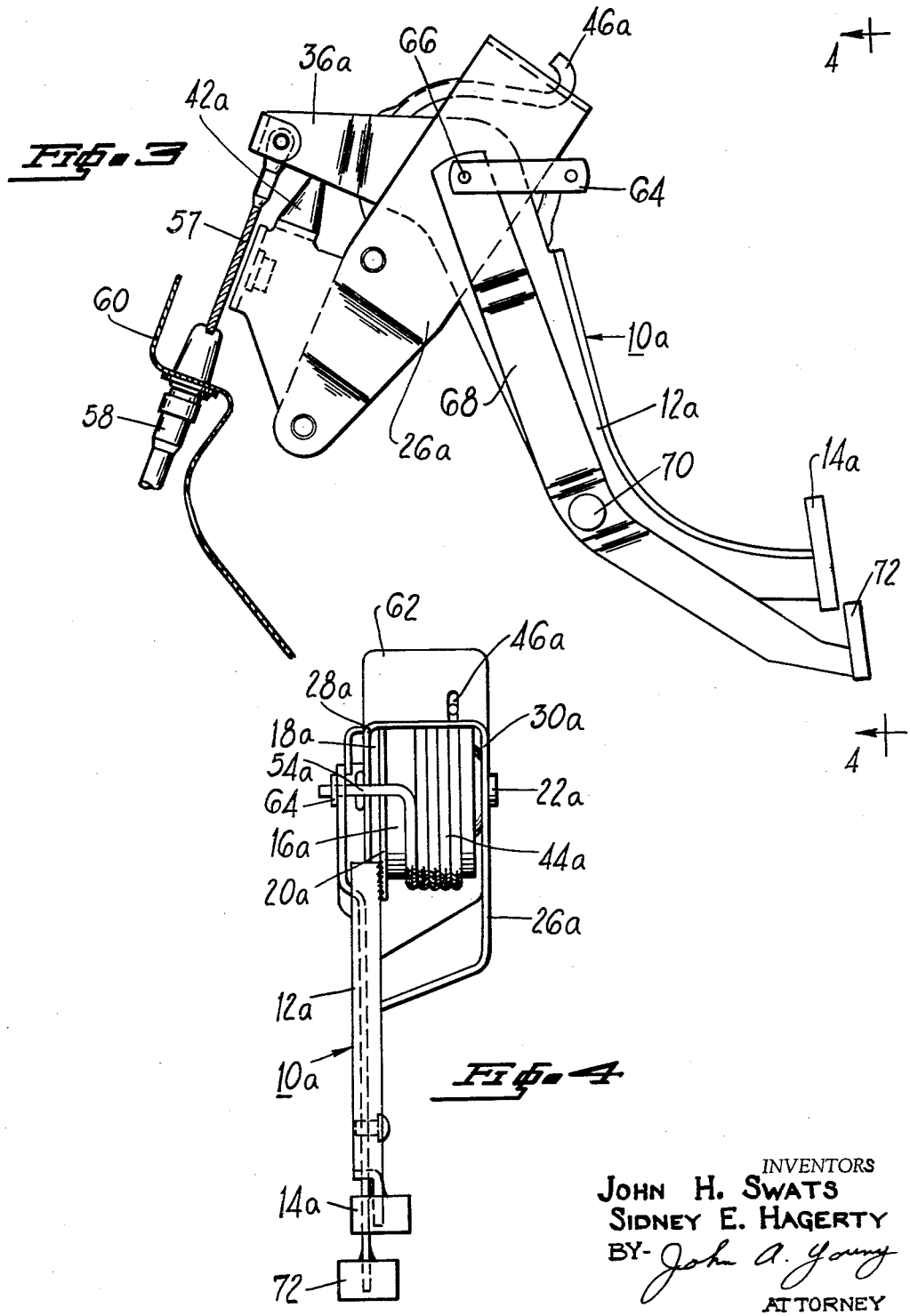

INVENTORS
JOHN H. SWATS
SIDNEY E. HAGERTY
BY John A. Young
ATTORNEY

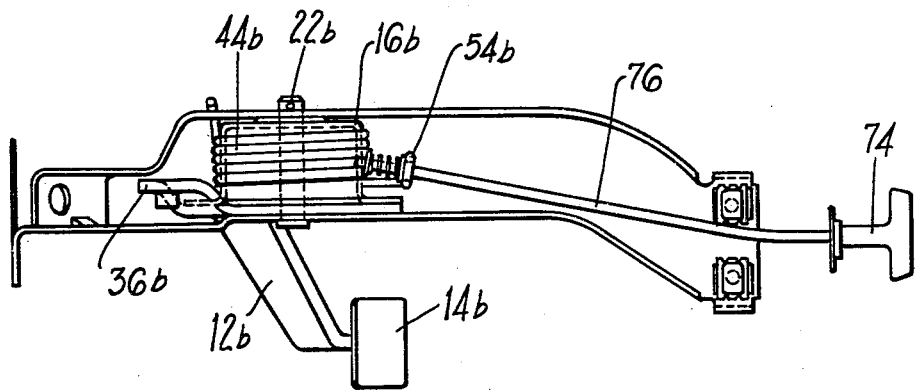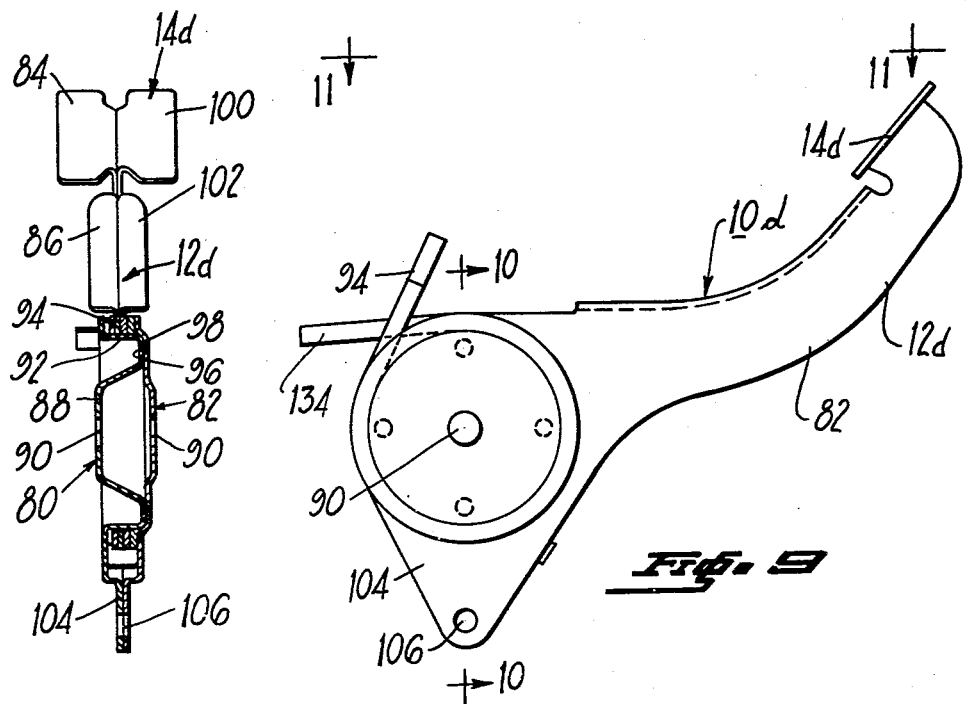

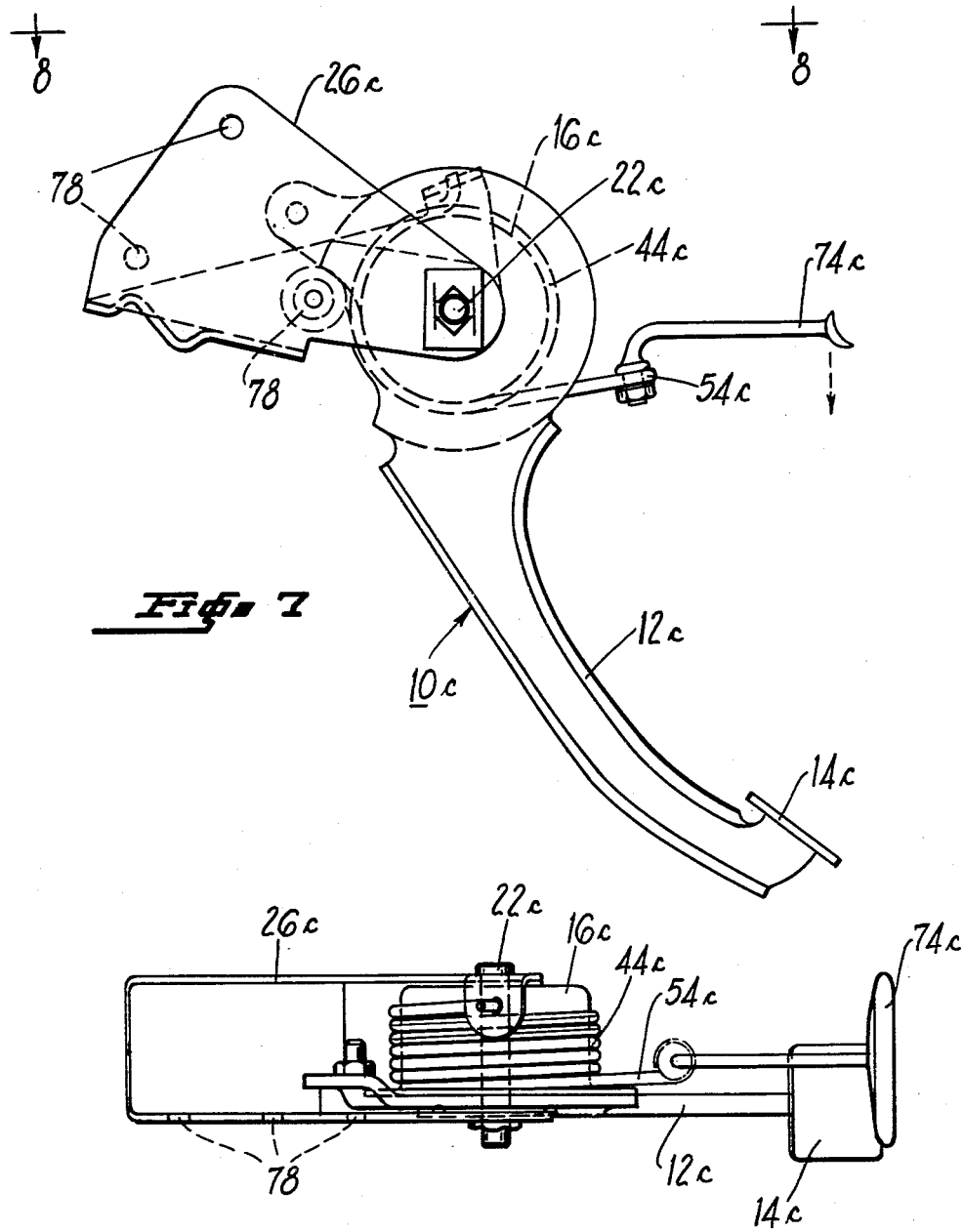

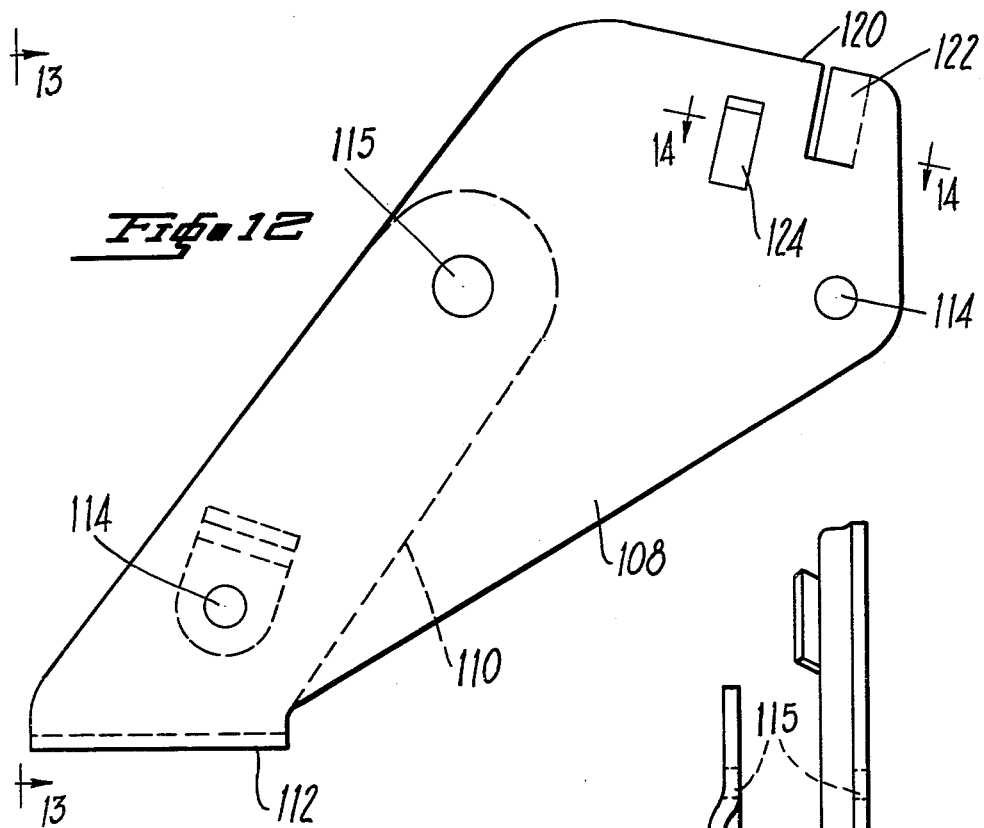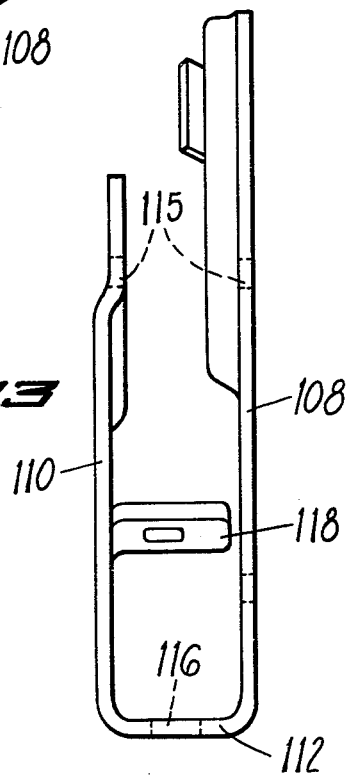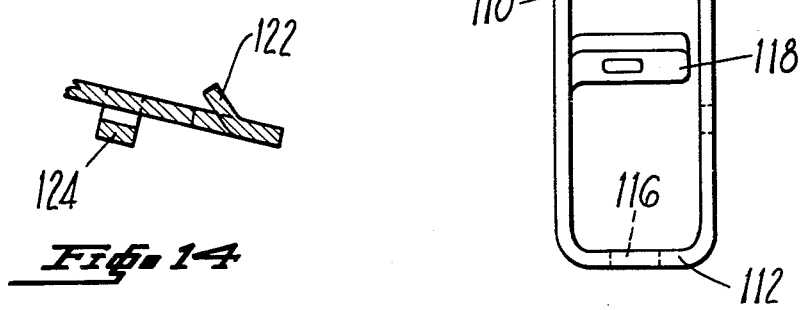

Sept. 22, 1964  J. H. SWATS ETAL  3,149,500
CONTROL MECHANISM
Original Filed Oct. 21, 1957  8 Sheets-Sheet 8
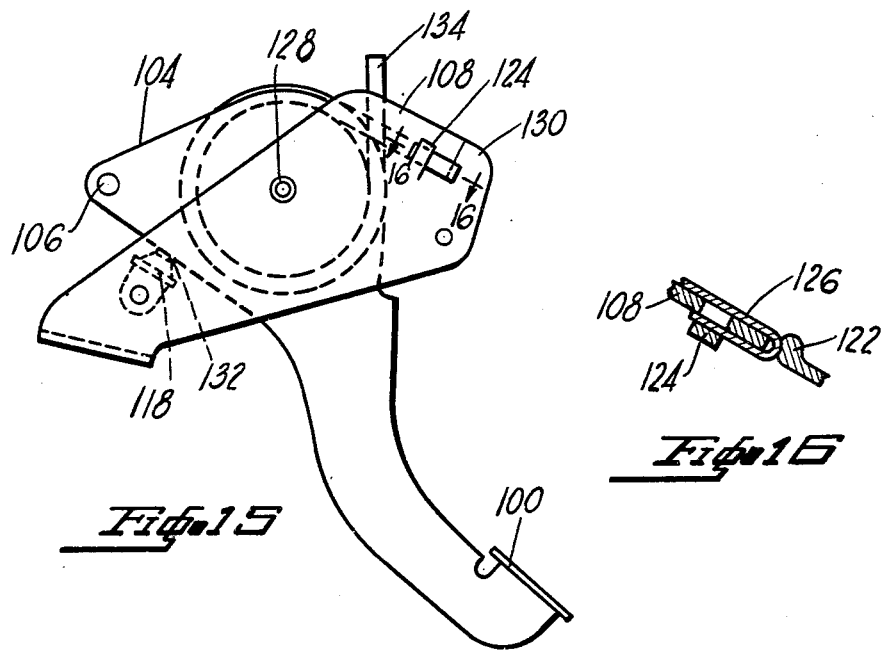
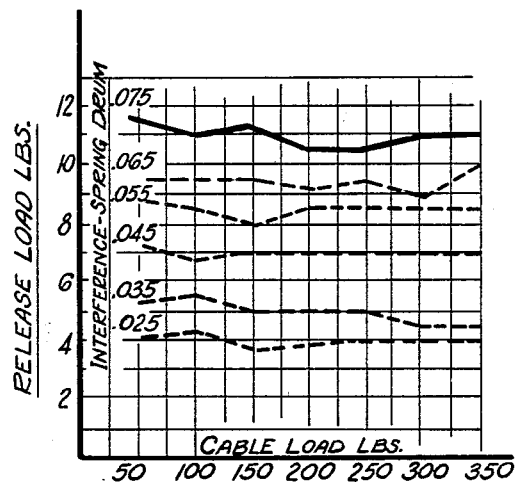
INVENTORS
JOHN H. SWATS
SIDNEY E. HAGERTY
BY
ATTORNEY United States Patent Office 3,149,500
Patented Sept. 22, 1964

3,149,500
CONTROL MECHANISM
John H. Swats and Sidney E. Hagerty, South Bend, Ind.,
assignors to The Bendix Corporation, South Bend, Ind.,
a corporation of Delaware
Continuation of application Ser. No. 691,390, Oct. 21,
1957. This application Apr. 13, 1961, Ser. No. 102,750
16 Claims. (Cl. 74—531)

This invention relates to a control mechanism and particularly to the operating portion of a parking brake mechanism which is actuated by foot-applied effort. This application is a continuation of U.S. application Serial No 691,390, filed October 21, 1957, now abandoned.

It is usually the practice in vehicle brake systems to provide both service and auxiliary brake applying systems, the latter being used for parking and also in the event of failure of the service brake applying system. The auxiliary brake aplying system may be associated with a brake which is separate from the service brakes, or it may be associated with the service brakes. The present invention is adapted for both arrangements.

While most of the parking brake systems are actuated by hand, it is generally recognized that greater input effort can be developed by using a foot-operated actuating mechanism. The reason for this is that greater input effort can be developed by pressing downwardly on a pedal with the foot than by a backward "yank" or drawing effort applied manually to an actuating lever.

With some of the foot actuated parking brake systems, there is required a releasing effort which is proportional to the applying effort. While it is desirable that parking brake systems have an operating mechanism by which it is easy to develop a maximum amount of applying effort, it is obvious that this input effort should not necessitate releasing forces which are impracticably high. If the release effort is proportional to the input effort, it is quite possible that the operator cannot develop enough force to release the brakes once they are applied. This would be especially true if the releasing mechanism were hand-operated and the applying mechanism foot-operated.

Accordingly, it is an object of this invention to provide a parking brake mechanism in which the effort required to release the brake is constant irrespective of the input effort, thereby enabling construction of a satisfactory foot-operated, hand released parking brake operation.

Another object of the invention from a performance standpoint is that the parking brake operating lever can be moved to any position between two established stops and locked in a preferred position so that any desired applying effort can be maintained on the parking brake, this applying effort being maintainable by a locking mechanism associated with the applying mechanism.

From a construction standpoint, it is an object of the invention to provide a simple operating mechanism which is made from a minimum number of parts, most of these parts being constructed by stamping operations.

It forms an important part of the present invention from a construction standpoint that there is provided a depending foot-operated lever, and an associated transverse drum, this drum being co-movable with the applying lever. A locking mechanism, consisting of a circularly wound spring, is provided in conjunction with the drum and has a one-way gripping function with respect to the drum so that the drum is permitted to turn in one direction and may thereafter be locked in any selected angular position by the spring member which prevents turning of the drum in an opposite direction. A further construction feature of the invention is a release mechanism adapted to expand a portion of the spring, this expansion serving to release the gripping effect of the spring on the drum, and thereafter permit return of the drum and release of the parking brake. This expansion of the spring can be acomplished either by manual, pedal, or other mechanical means.

By means of this simple arrangement of parts which are reduced in number insofar as possible, there results an economical but functionally satisfactory applying mechanism.

Another object of this invention is to provide a novel means for securing one free end portion of the circular spring member to a fixed support.

It is a further object of this invention to provide a novel method of making the parking brake applying mechanism.

Other objects and features of the invention will become apparent from a consideration of the following description, which proceeds with reference to the accompanying drawings, wherein:

FIGURE 2 is another isometric view of the same embodiment;

FIGURE 3 is a side view of another embodiment of the invention, in which both the applying and releasing mechanisms are pedal-operated;

FIGURE 4 is a front view of the operating mechanism, looking in the direction indicated by the arrows 4—4 in FIGURE 3;

FIGURE 6 is a top view of the applying mechanism shown in FIGURE 5, looking in the direction indicated by the arrows 6—6 in FIGURE 5;

FIGURE 7 is a side elevation of a further embodiment of the invention showing a different mounting and releasing arrangement for the pedal-operated parking brake, the release mechanism being manually operated;

FIGURE 8 is a top view of the operating mechanism shown in FIGURE 7, looking in the direction indicated by arrows 8—8 in FIGURE 7;

FIGURE 9 is a side eleavtion of the final embodiment of the invention shown without a mounting bracket;

FIGURE 10 is a sectional view of a final embodiment of the invention taken on line 10—10 of FIGURE 9;

FIGURE 12 is a side elevation of the mounting bracket for the operating mechanism shown in FIGURES 9–11;

FIGURE 13 is an end view of the mounting bracket shown in FIGURE 12, looking in the direction indicated by the arrows 13—13 in FIGURE 12;

FIGURE 14 is a sectional view, taken on the line 14—14 of FIGURE 12, showing the tabs formed for securing one free end of the brake spring to the bracket;

FIGURE 15 is a side elevation of the complete assembly of the operating mechanism and mounting bracket shown separately in the previous figures;

FIGURE 16 is a sectional view, taken on line 16—16 of FIGURE 15, showing the method of securing one free end of the brake spring to the mounting brackets;

FIGURE 17 is a graph showing actual experimental data of the brake release characteristics of the invention.

Figure 1:
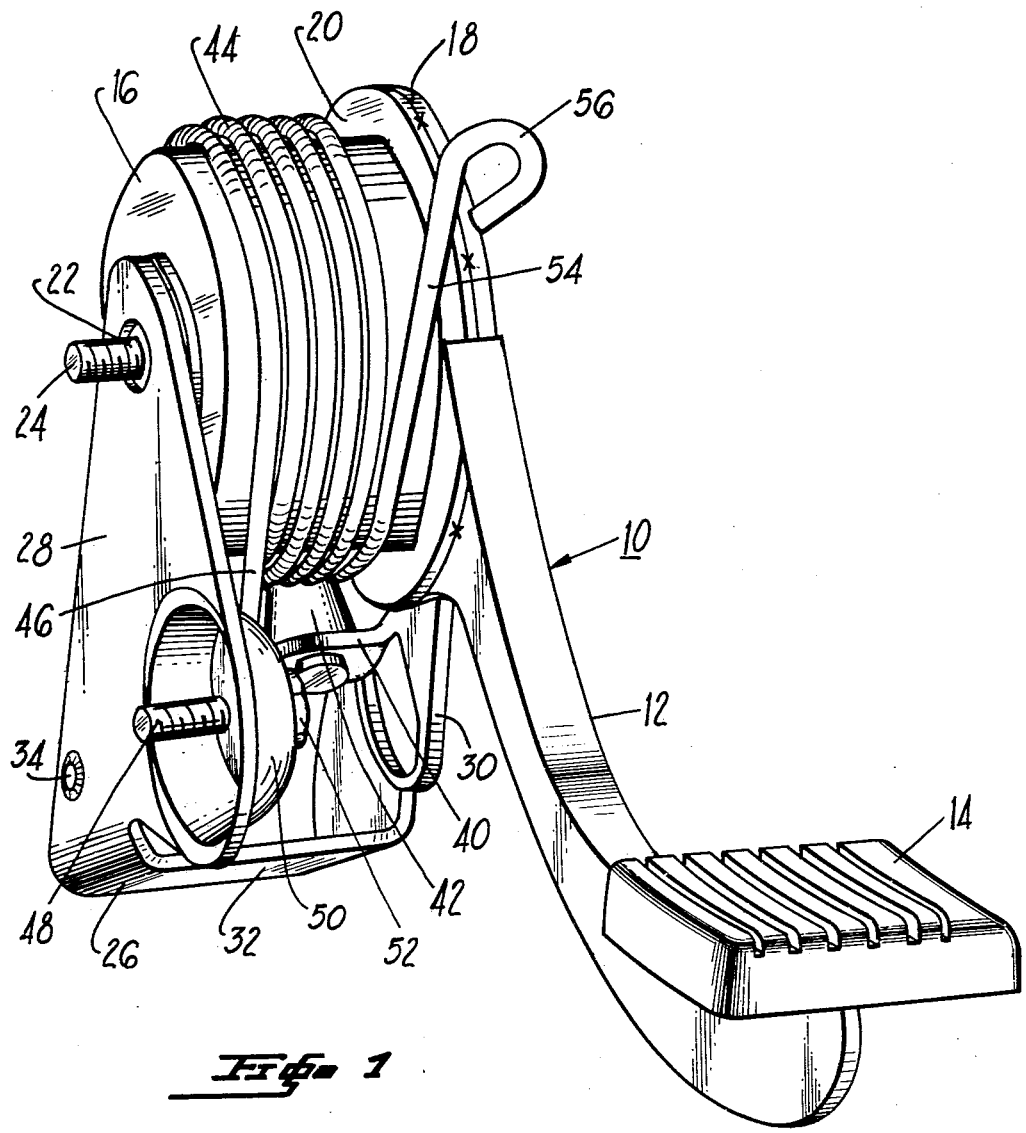
FIGURE 1 is an isometric view of a foot-operated parking brake applying mechanism, constituting one embodiment of the invention.

Referring now to FIGURES 1 and 2, the applying mechanism, designated generally by reference numeral 10, comprises a depending lever or pedal 12 having a pad 14 at one remote end thereof against which the operator applies his foot to actuate the parking brake. A cylindrical drum 16 is welded or otherwise secured to an enlarged end 18 of the pedal 12. The cylindrical drum 16 is flanged at 20 and welded around its periphery to the enlarged end 18 so as to be securely connected thereto. Thus, when the pedal 12 is caused to pivot, the drum 16 will turn therewith. The drum 16 and pedal 12 pivot on a stud 22 which is passed through both the pedal and the center of the drum. The end 24 of the stud 22 is reduced in diameter and threaded to assist in mounting the entire structure of the applying mechanism.

A mounting bracket 26 has spaced apart sides 28 and 30 which, in conjunction with the joining side 32, form a U-shaped construction. The side 30 extends on the opposite side of the drum to form additional support for the stud 22. The stud 22 is thus journalled at its ends on sides 28 and 30 of the mounting bracket. An opening 34 is also provided in side 28 and a fastener passed through the opening 34. The threaded end 24 of the stud 22 and the fastener (not shown) received through the opening 34 are received in a side wall (not shown), which forms part of the interior compartment of the vehicle.

The enlarged end 18 of the pedal 12 (FIGURE 2) has an integrally formed projecting lug 36 which is apertured at 38 for connection with an applying cable which leads to the brakes.

A portion 40 (FIGURE 1) of the side 30 is struck from the side 30 and bent transversely to form a seat for a rubber stop 42 which is designed to limit rotation of the lever 12 in a brake release direction. A projecting nib (not shown) is formed integrally with the enlarged portion 18 of the lever 12; this nib moves into contact with the stop 42 to prevent further rotation of the lever 12.

Surrounding the outer periphery of the drum 16 is a circular cross-section coil spring or other coiled flexible member 44 whose inner diameter is less than the outer diameter of the cylindrical portion of the drum 16, thus providing an interference fit between the two parts. The spring 44 consists of a number of coils which are arranged closely together with respect to each other and which are expanded over the drum. In so doing, the springs exerts a resilient gripping force on the cylindrical surface of the drum. The one end 46 of the spring is wrapped around an anchor bolt 48 which is received in side 28, the end 46 being thus fixed and nonmovable with respect to the drum 16.

Thus, when effort is applied to the pedal 12, the spring 44 will uncoil and allow the drum to be turned in that direction. When the tension in the applying cable connected at 38 attempts to turn the pedal 12 and drum 16 in the opposite direction, the spring 44 will coil tighter, increasing its frictional grip on the drum and prohibit the drum from turning in that direction.

A ridge 50 is drawn in the side 28. This ridge is generally circular and has a depressed circular recess 51 in its center that surrounds that portion of the spring end 46 which is bent around the anchor 48. This ridge and recess serve to hold the spring end 46 with respect to the side 28. The ridge 50 is not formed completely around the anchor 48 thereby allowing a portion of the spring to lie flat against the side 28. The end 46 of the spring 44 which is hooked over the anchor 48 is held against the side 28 by means of an enlarged end 52 of the bolt 48 and a washer.

The coil springg 44 terminates at the other end in a straight portion 54 which projects tangentially from the drum 16 and has an eyelet 56 formed in the end thereof. A manually operated lever mechanism (not shown) is arranged to exert effort on the straightened end 54 to bend it downwardly, thus expanding the adjacent coils of the spring and relieving a part of the frictional gripping force between the coils and the drum 16 to permit the cable, which is secured to opening 38, to swing the pedal 12 in a brake releasing direction. The return of the pedal 12 is limited by re-engagement of the integral nib with the stop 42. The release mechanism utilized to expand the coils of the spring may be constructed so as to maintain constant expansion of the spring which permits the brake to be released after actuation merely by the operator removing his foot from the pedal 12. Thus, the described applying mechanism can be adapted to allow the drum to be turned in either direction.

As described, the bracket can be mounted on the side wall of the driver's compartment, the pad 14 of the pedal 12 normally being contacted by the left foot of the vehicle operator. The pedal and applying mechanism are suspended sufficiently to the side and sufficiently high so as not to interfere with the other vehicle operating members. The mounting portion of the bracket consists of the threaded end 24 of the pivot stud 22, the fastener member received through opening 34, and the threaded end of anchor 48. This three-bolt mounting for the bracket is sufficient to hold the operating mechanism against any of the shear stress developed during brake application.

Referring next to the embodiment 10a shown in FIGURES 3 and 4, parts corresponding to those previously described will receive the same reference numeral, but include further the subscript "a" to distinguish the part from the previous embodiment.

A pedal 12a having a foot pad 14a is mounted for pivotal movement on a pivot bolt 22a which is supported at opposite ends on a fixed bracket 26a. The output end 36a of the applying lever has fastened thereto a brake applying cable 57 passing through a conduit 58 which is secured to the fire-wall 60 of the vehicle. The cable 57 leads to the parking brake mechanism and a pulling effort exerted by the output end 36a on the cable 57 is ultimately transmitted as actuating effort on the brake.

Referring to FIGURE 4, a drum 16a having a flanged portion 20a is welded or otherwise secured in some suitable manner around its periphery to the portion 18a of the pedal 12a. Thus, when the pedal 12a is caused to pivot the drum 16a is caused to turn therewith.

The position of the applying mechanism in FIGURE 3 is a normally released position. The portion 36a of the applying lever is in engagement with stop 42a, the stop 42a being secured to part of the mounting bracket 26a.

To lock the applying pedal in its various angular positions, there is provided a coil spring or other coiled flexible member designated generally by reference numeral 44a. The one end 46a is turned back and received through an opening in a transverse portion 62 of the bracket which joins the spaced apart sides 28a and 30a of the bracket.

A number of coils of the spring are formed about the outer cylindrical surface of the drum 16a just as in the previous embodiment. The inner diameter of the spring is less than the outer diameter of the drum 16a so that as the coils are forcibly expanded or sprung over the drum 16a they will exert a gripping action on the drum 16a. The coil spring terminates at the other end in a straight, transverse portion 54a which is secured to a floating link 64. The link 64 is joined through a pivot pin 66 to release lever 68. The release lever 68 is fulcrumed at 70 to the applying pedal 12a. At the end of the release pedal 68 is a pad 72 which is pushed on by the toe of the operator to release the locking portion of the applying apparatus and permit brake release.

In operation, the operator pushes with his foot on pad 14a swinging the pedal 12a about its pivot and turning therewith the drum 16a. The turning of the lever about its pivot point develops a pulling force on the cable 57 to apply the brake. Thus, the degree of brake applying force is determined by the amount of turning of the lever and drum 16a. When the applying effort on the pad 14a is relieved, turning of the pedal 12a in a brake release direction is prevented by the gripping action of the spring 44a, which serves as a one-way brake preventing brake relase. It thus happens that the applying apparatus is locked in a brake applying position, and this position can vary to any extent desired to give any degree of braking effort. With the applying apparatus thus held in a locked position, the brakes are applied and the vehicle is retarded against motion or, in the case of an emergency brake application, the brakes develop a retarding effort tending to slow the vehicle wheels and stop their rotation.

To release the applying mechanism, the operator needs only to push on the pad 72, thereby pivoting the release lever 68 on the fulcrum 70, and causing the floating link 64 to push outwardly on the end 54a of the spring which expands adjacent the coils of the spring and releases the frictional gripping force of the coils on the drum 16a. When the brake spring 44a does release its force on the drum 16a, the tension force on the applying cable 57 will swing the applying lever 12a until 36a is again brought into engagement with the stop 42a thereby relieving applying force on the brakes.

Figure 5:
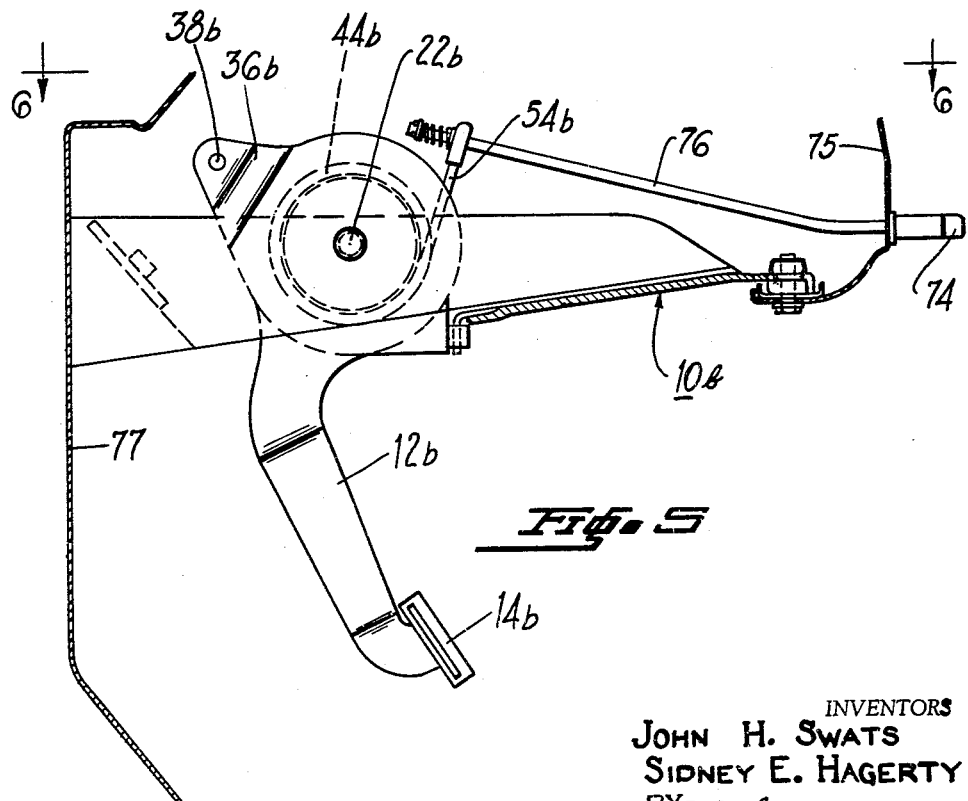
FIGURE 5 is a side elevation of a further embodiment of the invention, in which the applying mechanism is pedal-operated and manually released.

Referring next to the embodiment shown in FIGURES 5 and 6, parts corresponding to those previously described will receive the same reference numerals, but include the subscript "b."

There is included in this embodiment 10b an applying pedal 12b which is pivoted at 22b and has a portion 36b adapted for connection with an applying cable (not shown). A drum 16b having a cylindrical surface is secured to the pedal 12b and is turnable therewith when effort is applied to the pedal 12b to actuate the brake. A one-way brake consisting of a coil spring 44b is used to lock the pedal 12b in any desired angular position, this angular position determining the amount of brake applying force communicated to the brake. When it is desired to release the brake, the operator merely pulls on handle 74, which is located on the dash 75. A rod 76 connects the handle 74 and the free end 54b of the spring 44b. The end 54b is thus pulled away from the drum, expanding the adjacent coils of the brake spring and relaxing the frictional grip of the spring 44b on the drum 16b. This permits the pedal 12b to be returned to its original position wherein a portion of the pedal 12b contacts a fixed stop, just as in previous embodiments. The applying mechanism 10b is mounted on the firewall 77, as shown.

In this embodiment the brake is pedal-operated and locked and thereafter manually released by pulling on the handle 74.

Referring next to the embodiment 10c shown in FIGURES 7 and 8, wherein the reference numerals will include the subscript "c" to distinguish them from parts previously described, there will be shown a method in which manual release occurs by pushing down on a manually operated lever.

The pedal 12c is fulcrumed at a portion between its ends on pivot pin 22c. Applying effort is exerted against the pad 14c to swing the pedal downwardly, and develop pulling force on the applying cable which leads to the brake. A one-way brake spring 44c grips cylindrical drum 16c which is fixed to the pedal the same as in the previous embodiments. When it is desired to release the brake, the handle 74c is pushed downwardly as indicated by the dotted arrow in FIGURE 7. The free end 54c of the spring is pushed downwardly thereby expanding the adjacent coils of the clutch spring 44c. When the coil spring is thus expanded, its frictional grip on the drum 16c is relaxed sufficiently to permit the applying cable to return the pedal 12c to its original position wherein it contacts a fixed stop just as in the previous embodiments.

There is some advantage to this release technique since the handle 74c instead of being drawn outwardly can merely be swung downward. Considerable force can be developed in this manner. Mounting bracket, designated generally by reference numeral 26c, has a number of holes indicated at 78 which can receive fasteners (not shown) to connect the bracket 26c with a portion of the vehicle in the interior compartment on the firewall or side kick panel, etc.

Figure 11:
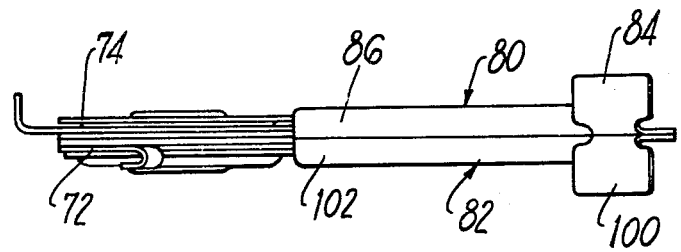
FIGURE 11 is a top view of the operating mechanism shown in FIGURE 10, looking in the direction indicated by the arrows 11—11 in FIGURE 10.

Referring next to the embodiment 10d shown in FIGURES 9, 10 and 11, portions of the actuating system corresponding to those previously described will be referred to with the same reference numeral but include also the subscript "d" to distinguish them from previous components.

In FIGURES 9, 10 and 11, there are shown detail views of the applying lever components without the mounting bracket. The parking brake mechanism is made up of two stampings 80 and 82. The stamping 80 is formed initially as a flat member and has at the one end a bent-over pedal half 84 and a transverse strengthening rib portion 86. Centrally of the stamping is a drawn cylindrical portion 88 having an opening 90. The drawn portion 88 has a cylindrical drum section 92 which is combined with the spring clutch member 94. A portion 96 of the drawn section 88 lies flat against stamping 82 and is welded at 98 to the stamped portion 82 so that the two portions together make up the pedal and drum assembly. The stamping 82 has a transverse pedal portion 100 which is in alignment with pedal portion 84 of the stamping 80 to make up the complete pedal pad 14d. Likewise, a strengthening web 102 is formed symmetrically with portion 86 to provide additional transverse strengthening.

At the opposite end 104 of the pedal 14d, the two stamping portions lie flatly together and an opening 106 is provided therein for attachment with an applying cable. The spring 94 in contrast with the previously described springs, is rectangular in cross section and lies flatly against the drum surface to provide maximum gripping surface along the entire lateral width of the drum. Because of the added gripping surface of the flat wire, a narrower drum surface is required to provide locking action on the pedal.

FIGURES 12 and 13 are front and side views, respectively, of the mounting bracket. The mounting consists generally of a U-shaped bracket which serves to pivotally suspend the actuating pedal 12d. The bracket consists of two spaced sides 108 and 110 which are joined by portion 112. The bracket is fastened to the side kickboard in the driver's compartment by means of fasteners (not shown). These fasteners are received through opening 114 in the side 108. Openings 115 in sides 108 and 110 are to receive the stud upon which the pedal assembly pivots. An opening 116 is provided in side 112 for the applying cable which is threaded through the opening for attachment with opening 106 in the applying pedal 12d. Side 110 has a tab 118 which is formed integrally therewith, this tab being struck from the side 110 and bent over so as to provide a seat for a stop 132 which limits movement of the applying pedal in a brake release direction.

The side 108 is adapted for securement with the spring 94. Referring to FIGURES 12, 14 and 15 at the upper edge 120 of the side 108 there is a sheared portion which permits a tab 122 to be bent away from the side. Also in side 108 is a struck offset finger 124.

Referring next to FIGURES 10, 15 and 16, there will be described the final assembled brake pedal and bracket. In FIGURE 10, the spring 94 is stretched over drum section 92 of the stamping 80 and thereafter the stamping 82 is welded to the stamping 80 at 98 to hold the two stampings together. The two stampings thus enclose the spring 94. The two joined stampings, along with the spring, are now ready for attachment with the bracket. Referring to FIGURES 15 and 16, as the pedal is fitted between the sides of the bracket, the looped end 126 of the spring is caused to slide between the tab 122 and the side 108, and the end of the loop 126 passes between the finger 124 and the side 108. Thereafter, the pedal is held in place by means of a pivot pin 128 which passes through openings 90 in sides 80 and 82 and the openings 115 in sides 108 and 110 of the mounting bracket.

The end 126 of the spring is held permanently in place by swaging the tab 122 back to its original shape. Referring to FIGURE 15, the portion 130 of the tab is brought back into conformance with the side 108 of the bracket and the portion 122 (FIGURE 16) lying adjacent the spring becomes enlarged and bulbs out to lock the end and hold it in place. The finger 124 is then crimped tightly against the end 126 to provide further locking action on the end of the spring.

To apply the brake, the pedal pad 14d which is made up of portions 84 and 100 is depressed (referring to FIGURE 15), thus rotating the applying lever clockwise on pivot 128. Whatever angular position the pedal 100 is moved to by the operator's effort, the pedal will be held in locked position after the applying effort is released by means of the clutch spring 94. When it is desired to release the brakes, manual or pedal effort can be used for pulling the end 134 of the spring away from the drum 92. When the end 134 is pulled away, the coils of the spring are expanded and this releases their gripping effort on the drum and permits the tension in the applying cable to rotate the pedal counterclockwise (FIGURE 15) until the pedal engages with a resilient stop 132 which is fitted into tab 118.

A method of manufacturing the control mechanism is disclosed in our co-pending application U.S. Serial Number 102,881, now U.S. Patent No. 3,069,764.

There is shown in FIGURE 17 an operational advantage of all of the embodiments described. This advantage can be stated in terms of the release load vs. cable load. By cable load is mean the amount of applying force which is developed on the applying pedal and communicated to the brakes as applying effort thereon. The release load is a measure of the amount of effort that needs to be developed to release the brake. It is characteristic of the invention that with a given brake, pedal and brake-spring design, that the release load remains constant regardless of the amount of applying effort which is applied to the brakes. Referring to FIGURE 17, which is a graph showing actual exepirmental evidence of the brake release characteristics, it will be seen that the release load does not vary appreciably regardless of the cable load. This means that, regardless of the applying effort which is exerted on the brakes by the applying pedal in its locked position, there will be no change in the releasing effort necessary to unlock the applying pedal and allow it to return to its original position thereby relieving the brake applying load. We regard this as a substantial advantage in that most people are capable of developing considerably more force with their foot in applying the foot-operated parking brake than they are in releasing the brake by a manual pulling or pushing operation, and that, from past experience, it is quite possible for the vehicle driver to apply the brake with such force that it is impossible or very difficult to release the brake with the releasing means provided.

The different lines which are shown in FIGURE 17 indicate six different release loads which can be provided depending upon the gripping force between the coil spring and the drum, this being obtained by selecting the relative diametral dimension of the spring and drum, respectively. Where the inner diameter of the spring coil is very much smaller than the drum, then the gripping action of the spring is greater and develops higher orders of releasing loads, but these loads do remain constant irrespective of the applying force which determined the angular position of the pedal in its locked position. Likewise, although the different release load is possible as indicated with the other five, this release load does remain constant.

Although there are only a few selected example embodiments of the invention which have been chosen to describe the invention and its method of manufacture, it will be appreciated that these are merely illustrative of the invention and are not to be interpreted as restrictive thereof.

It is intended that such revisions and variations of the invention as are reasonably expected on the part of those skilled in the art will be included within the scope of the following claims.

We claim:

1. A parking brake mechanism for vehicles comprising a support member for securing said mechanism to a fixed part of a vehicle, a stop mounted on said support member, a mechanically operated applying lever having a portion intermediate the ends thereof fulcrumd upon said support, said lever having a portion thereof so disposed to engage said stop when said lever is in an initial position, a drum secured to said applying lever and pivotally mounted between portions of said support member, a coiled flexible member wrapped tightly around the periphery of said drum and gripping the same, one end of said coiled member being secured to the support member, a second lever member pivotally mounted on the applying lever, and an articulated link connected to one end of said second lever, the other end of said link being secured to the other free end portion of the coiled member so as to release the grip of said coiled member on said drum upon actuation of the second lever member.

2. A parking brake mechanism for vehicles comprising a supporting member, an applying lever having a portion intermediate the ends thereof fulcrumed upon said supporting member, a drum connected to said lever and turnable therewith, a coiled flexible member wrapped around the periphery of said drum and gripping the same, one end of said flexible member being secured to the supporting member, and manually operated means operatively secured to the other end of said coiled flexible member for releasing the grip of said coiled member on said drum.

3. In combination with a brake, an applying mechanism comprising a supporting member, an applying lever having a portion intermediate the ends thereof fulcrumed upon said supporting member and having one end thereof operatively connected to the brake, a drum turnable with said lever, a coiled flexible member wrapped around the periphery of the drum and gripping the same, said coiled member having one free end portion connected to the supporting member, and releasing means connected to the other free end portion of said coiled flexible member, said releasing means being constructed and arranged to expand the coils of the flexible member to relieve their frictional grip on the drum upon actuation of said means and thereby release the brake.

4. In combination with an applying mechanism in accordance with claim 3, said releasing means comprising a manually operated handle operatively connected to said other free end portion of the coiled flexible member to allow the coils thereof to relieve their frictional grip on the drum when said handle is forced downwardly, thereby releasing the brake.

5. An applying mechanism according to claim 3 in which the releasing means comprises a manually operated handle operatively connected to said other free end portion of the coiled flexible member to allow the coils thereof to relieve their frictional grip on the drum when said handle is pulled outwardly thereby releasing the brake.

6. An applying mechanism according to claim 3 in which the connection between said one free end portion of the coiled flexible member and the supporting member comprises a circular ridge formed on the supporting member, a circular recess formed in the center of said ridge, an opening in the center of said recess, and an anchor received in said opening, said one free end portion of the coiled flexible member being wrapped around said anchor and fit into the circular recess to secure said one free end portion to the supporting member.

7. In combination with a brake, a brake applying mechanism comprising a support, a lever fulcrumed upon said support and having a portion thereof operatively connected to the brake, a drum turnable with said lever, a coiled flexible member wrapped around the periphery of said drum and having one free end portion connected to the support, and releasing means connected to the other free end portion of said coiled flexible member, said means being constructed and arranged to expand the flexible coiled member causing the member to unwrap from the drum whereby the force required to cause said release is the same regardless of the position of the locking force exerted by the coiled member on said drum.

8. A control mechanism comprising a supporting member, a lever pivotally mounted thereon and having an output end and an input end, a drum turnable with said lever, a coiled flexible member wrapped around the periphery of said drum gripping the same and having one end secured to the supporting member so as to allow turning of the drum in one direction only and thereby providing an unlimited number of locking positions for said lever between a fully applied and fully released position, and means to release said coiled flexible member from its grip on the drum to permit turning of the drum and lever.

9. A control mechanism comprising a lever fulcrumed at a point intermediate the ends thereof, a drum turnable with said lever, a coiled flexible member wrapped around the outer periphery of said drum to permit turning of the drum in one direction only, means for unwrapping said flexible member to permit turning of said drum with respect to said flexible member in the direction opposite to said one direction, and means for mounting said applying mechanism to a fixed support.

10. The control mechanism of claim 9 in which the coiled flexible member is of rectangular cross section the least width dimension of which extends laterally across the drum.

11. The control mechanism of claim 9 in which the coiled flexible member is of a square cross section.

12. A control mechanism comprising a cylindrical member, a coiled flexible member wrapped around the outer surface of said cylindrical member and exerting by virtue of the construction a frictional force thereon, releasing means for relieving the frictional force exerted by said coiled flexible member on said cylindrical member, and means to prevent said coiled flexible member from turning with respect to said cylindrical member, whereby said cylindrical member is prevented from turning in one direction by said frictional force and turnable in either direction upon relief of said frictional force by said releasing means.

13. A brake applying apparatus comprising a brake pedal, means for locking said brake pedal in the desired angular setting which determines the brake applying effort developed through said pedal, said means including a cylindrically shaped drum operatively secured to said pedal and movable therewith, and a coil spring expanded over said drum to be in gripping engagement therewith, one end of said spring being held fixed so that turning of said drum and pedal is prevented in one direction by the wrapping action of said spring, the other end of said spring being floatable to permit turning of the drum and pedal in the other direction to allow brake application, and release means operatively connected to the other end of said spring to expand the spring and relieve the gripping of said spring thereby permitting turning of said drum in said one direction, to release the pedal from its locked position and therefore release the brake.

14. A brake applying apparatus according to claim 13 in which said pedal is formed of two pedal halves located side by side and connected together, and said drum portion is formed integrally with one of said pedal halves and is located therebetween.

15. The brake applying apparatus of claim 14 including a pivot pin received through openings in the spaced apart sides of said pedal halves and journalled therein, and a mounting bracket having sides extending on each side of said pedal to receive opposite ends of said pin to pivotally support said applying apparatus.

16. A control mechanism comprising a support member, a stop mounted on said support member, an applying member having a portion intermediate the ends thereof fulcrumed upon said support, said applying member having a portion thereof so disposed to engage said stop when said applying member is in an initial position, a drum secured to said applying member for movement therewith and rotatably mounted to said support member, a coiled flexible member wrapped around the periphery of the drum and gripping the same, said coiled member having one free end portion connected to said support member, and releasing means connected to the other free end portion of said coiled flexible member, said releasing means being constructed and arranged to expand the coils of the flexible member to relieve their grip on the drum upon actuation of said releasing means.

References Cited in the file of this patent
UNITED STATES PATENTS

| Re. 16,565 | Myers | Mar. 1, 1927 |
| 787,788 | Pinard | Apr. 18, 1905 |
| 823,971 | Remondy | June 19, 1906 |
| 2,629,288 | Jenssen et al. | Feb. 24, 1953 |
| 2,881,881 | Sacchiri et al. | Apr. 14, 1959 |